(12) United States Patent
Kang et al.

(10) Patent No.: US 9,036,984 B2
(45) Date of Patent: May 19, 2015

(54) INFORMATION STORAGE MEDIUM CONTAINING MULTI-PATH DATA, AND STORAGE APPARATUS AND PLAYER THEREOF

(75) Inventors: Man-seok Kang, Gyeonggi-do (KR); Seong-jin Moon, Gyeonggi-do (KR); Kil-soo Jung, Gyenoggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 2415 days.

(21) Appl. No.: 10/793,955

(22) Filed: Mar. 8, 2004

(65) Prior Publication Data

US 2004/0228606 A1    Nov. 18, 2004

Related U.S. Application Data

(60) Provisional application No. 60/452,551, filed on Mar. 7, 2003, provisional application No. 60/452,558, filed on Mar. 7, 2003, provisional application No. 60/458,431, filed on Mar. 31, 2003.

(30) Foreign Application Priority Data

Mar. 28, 2003   (KR) .................. 10-2003-0019683
Jan. 8, 2004    (KR) .................. 10-2004-0001088

(51) Int. Cl.
  *H04N 5/76*    (2006.01)
  *H04N 5/77*    (2006.01)
  *G11B 27/034*  (2006.01)
(Continued)

(52) U.S. Cl.
  CPC ............ *G11B 27/034* (2013.01); *G11B 27/105* (2013.01); *G11B 27/3027* (2013.01); *G11B 27/329* (2013.01); *G11B 2020/10944* (2013.01); *G11B 2220/2562* (2013.01);
(Continued)

(58) Field of Classification Search
  None
  See application file for complete search history.

(56) References Cited

U.S. PATENT DOCUMENTS 5,784,528 A       7/1998  Yamane et al.
5,819,003 A  *  10/1998  Hirayama et al. .............. 386/95
(Continued)

FOREIGN PATENT DOCUMENTS

CN       1167978 A     12/1997
EP       0847198 A1    6/1998
(Continued)

OTHER PUBLICATIONS

U.S. Appl. No. 10/683,398, filed Oct. 14, 2003, Kil-Soo Jung, et al., Samsung Electronics Co., Ltd., Suwon-si, Republic of Korea.
(Continued)

*Primary Examiner* — Heather Jones
(74) *Attorney, Agent, or Firm* — NSIP Law

(57) ABSTRACT

A data recording and reproducing apparatus supporting multi-path recording reproduction, and an information storage medium on which multi-path data is recorded. The information storage medium includes at least one clip that is a recording unit containing presentation data for respective paths, wherein presentation data in a selected path is continuously reproduced without changing paths, and additional path information regarding a block of the path is recorded separately from the presentation data. Accordingly, it is possible to more effectively use a recording space and reduce the frequency of jumping to clips, thereby effectively reading the multi-path presentation data from the information storage medium.

18 Claims, 10 Drawing Sheets

(51) Int. Cl.
*G11B 27/10* (2006.01)
*G11B 27/30* (2006.01)
*G11B 27/32* (2006.01)
H04N 9/804 (2006.01)
*G11B 20/10* (2006.01)
*H04N 5/85* (2006.01)
*H04N 9/82* (2006.01)

(52) U.S. Cl.
CPC .............. *H04N 5/85* (2013.01); H04N 9/8042 (2013.01); *H04N 9/8205* (2013.01); *H04N 9/8227* (2013.01)

(56) References Cited

U.S. PATENT DOCUMENTS

| | | | | |
|---|---|---|---|---|
| 5,825,727 | A * | 10/1998 | Han | 386/46 |
| 5,884,004 | A * | 3/1999 | Sato et al. | 386/98 |
| 6,128,432 | A | 10/2000 | Lee | |
| 6,393,574 | B1 | 5/2002 | Kashiwagi et al. | |
| 7,263,271 | B2 * | 8/2007 | Otomo et al. | 386/46 |
| 8,380,054 | B2 | 2/2013 | Jung et al. | |
| 2001/0038745 | A1 | 11/2001 | Sugimoto et al. | |
| 2004/0148456 | A1 * | 7/2004 | Seo et al. | 711/100 |

FOREIGN PATENT DOCUMENTS

| | | |
|---|---|---|
| EP | 1 041 569 | 10/2000 |
| JP | 10-340570 | 12/1998 |
| JP | 11-027630 | 1/1999 |
| JP | 11-110950 | 4/1999 |
| JP | 2002-158971 | 5/2002 |
| JP | 2002-216460 | 8/2002 |
| JP | 2002-313066 | 10/2002 |
| JP | 2003-101957 | 4/2003 |
| JP | 4420897 B2 | 2/2010 |
| KR | 2004-290 A | 1/2004 |
| KR | 2004-30992 | 4/2004 |
| KR | 2004-30994 | 4/2004 |
| KR | 2004-30995 | 4/2004 |
| KR | 2004-30996 | 4/2004 |
| KR | 2004-31009 | 4/2004 |
| WO | WO 2004/001750 A1 | 12/2003 |
| WO | WO 2004/036580 | 4/2004 |

OTHER PUBLICATIONS

U.S. Appl. No. 10/683,438, filed Oct. 14, 2003, Kil-Soo Jung, et al., Samsung Electronics Co., Ltd., Suwon-si, Republic of Korea.
English language related PCT International Search Report in International Application No. PCT/KR2003/002106, dated Jan. 31, 2004.
English language related PCT International Search Report in International Application No. PCT/KR2003/002122, dated Feb. 12, 2004.
Office Action issued on Aug. 17, 2007 by the Chinese Intellectual Property Office for Chinese Patent Application No. 2004800008756.
U.S. Appl. No. 12/142,056, filed Jun. 19, 2008, Man-seok Kang et al., Samsung Electronics Co., Ltd.
U.S. Appl. No. 12/142,072, filed Jun. 19, 2008, Man-seok Kang et al., Samsung Electronics Co., Ltd.
U.S. Appl. No. 12/142,171, filed Jun. 19, 2008, Man-seok Kang et al., Samsung Electronics Co., Ltd.
U.S. Appl. No. 12/142,193, filed Jun. 19, 2008, Man-seok Kang et al., Samsung Electronics Co., Ltd.
Office Action issued in Japanese Patent Application No. 2006-507748 on May 26, 2009.
European Examination Report issued on Jan. 31, 2011, in corresponding European Patent Application No. 04718456.9 (7 pages).
Examiner's Report dated Mar. 30, 2012, in counterpart Malaysian Patent Application No. PI20033788 (6 pages, in English).
European Communication mailed Jun. 12, 2012 in counterpart European Patent Application No. 03751522.8 (17 pages, in English).
Malaysian Examination Report issued Jun. 29, 2012 in counterpart Malaysian Patent Application No. PI 20033789 (4 pages, in English).
Malaysian Decision on Grant mailed Sep. 13, 2013 in counterpart Malaysian Application No. PI20033789 (3 pages, in English).
European Summons to Oral Proceedings mailed Oct. 1, 2013 in counterpart European Application No. 03751522.8 (10 pages, in English).
Chinese Office Action mailed Sep. 12, 2012, issued in counterpart Chinese Patent Application No. 201010180592.1; 5 pages in Chinese language.
European Summons to Attend Oral Proceedings mailed Oct. 29, 2012, issued in counterpart European Patent Application No. 08 165 988.0; 6 pages in English language.

\* cited by examiner

INFORMATION STORAGE MEDIUM CONTAINING MULTI-PATH DATA, AND STORAGE APPARATUS AND PLAYER THEREOF

CROSS-REFERENCE TO RELATED APPLICATIONS

This application claims the priority benefit of U.S. Provisional Application No. 60/452,551, filed Mar. 7, 2003; U.S. Provisional Application No. 60/452,558, filed Mar. 7, 2003; U.S. Provisional Application No. 60/458,431, filed Mar. 31, 2003; Korean Patent Application No. 10-2003-0019683, filed on Mar. 28, 2003, in the Korean Intellectual Property Office; and Korean Patent Application No. 10-2004-0001088, filed on Jan. 8, 2004, in the Korean Intellectual Property Office, all of the disclosures of which are incorporated herein by reference.

BACKGROUND OF THE INVENTION

1. Field of the Invention

The present invention relates to multi-path data, and more particularly, to a recording/reproducing apparatus recording and reproducing data with a multi-path structure and an information storage medium on which the multi-path data is recorded.

2. Description of the Related Art

A multi-path denotes a plurality of paths including language credit data and multi-angle data, through which Audio-Video (AV) data is reproduced/recorded. A digital versatile disc (DVD) is a representative of conventional information storage media on which multi-path data is recorded using an interleaving method in which the data is divided into predetermined units and the units are alternately recorded. The interleaving method enables quick reproduction of data stored on a related path when a path change is instructed by a user. Generally, the multi-path recording is performed with regard to an information storage medium which has no recording position restrictions and a multi-path data structure in which data is recorded to have different reproduction times.

FIG. 1 illustrates a data structure of a DVD with a multi-path data configuration according to the interleaving method. Referring to FIG. 1, the DVD is divided into a video management group (VMG) area 110 and a plurality of video title set (VTS) areas 120a through 120n. Information regarding management of titles and title menus is stored in the VMG area 110 and information regarding titles is recorded in the plurality of VTS areas 120a through 120n. In general, the VMG area 110 comprises two or three files and each of the VTS 120a through 120n area comprises three to twelve files.

FIG. 2 illustrates a detailed data structure of the VMG area 110 of FIG. 1. Referring to FIG. 2, the VMG area 110 includes a video management group information (VMGI) area 112 containing additional information regarding the VMG area 110, a video object subtitle (VOBS) area 114 containing video object information regarding the title menu, and a VMGI backup area 116. Each of the VMGI area 112, the VOBS area 114, and the VMGI backup area 116 exists as a file. However, the inclusion of the VOBS area 114 in the VMG area 110 is optional, so that in some cases, the VOBS area 114 may not be formed in the VMG area.

FIG. 3 illustrates a detailed data structure of the VTS area 120n of FIG. 1. Referring to FIG. 3, video title set information (VTSI) 310, VOBS 320 for a menu, which is presentation data for a menu screen, VOBS 330 for a video title set, and VTSI backup data 340 are recorded in the VTS area 120n. Recording of the VOBS 320 for menu is optional for displaying a menu screen. The VOBS 330 for a video title set is divided into a plurality of video objects (VOBs) and a plurality of cells that are recording units. Each VOB comprises a plurality of cells. In this disclosure, the basic recording unit is a recording cell.

FIG. 4 illustrates a video title linked to a plurality of program chains (PGCs) for controlling reproduction of the video title video objects according to the interleaving method. As shown in FIG. 4, when one of the plurality of PGCs is selected and reproduced after reproduction of another PGC, a command for determining the PGC to be selected and reproduced may be stored on the DVD. Controlling the sequence of reproduction is referred to as navigation. A command for determining navigation is contained in program chain information (PGCI).

FIG. 5 illustrates a data structure of the PGC according to the interleaving method. Referring to FIG. 5, the PGC is stored in a PGCI 510. The PGCI 510 contains a pre-command 512 that includes a navigation command, a post-command 516, and a plurality of programs 514a through 514n. The pre-command 512 is carried out prior to reproduction of a particular program linked to the PGC and the post-command 516 is carried out after the reproduction of the particular program linked to the PGC. Each of the programs 514a through 514n contains a plurality of reproduction cell information. Reproduction cells included in the programs 514a through 514n are linked to respective recording cells as recording units included in a VOB. Each reproduction cell, i.e., a reproduction unit, has a reproduction cell command (CC) that is carried out after reproduction thereof. Therefore, the PGCI is a hierarchical description of the PGC, which is a reproduction unit, and has an information structure that links a reproduction cell, which is the basic reproduction unit, to a recording cell that is the basic recording unit. In particular, the PGC is a link of a plurality of reproduction cells that are reproduction units. Here, the plurality of reproduction cells of a program 514 may form a path block.

FIG. 6 illustrates a structure of a path block 600 shown in FIG. 5. Referring to FIG. 6, the path block 600 is constructed such that a plurality of reproduction cells are arranged in parallel so that only one of these reproduction cells can be reproduced. The reproduction cells forming the path block 600 may have the same reproduction time or different reproduction times, and each of the reproduction cells corresponds to a specific path in the path block 600. If reproduction cells, which are reproduction units, form a path block 600, corresponding linked VOBs and recording cells, which are recording units, of a path of the path block 600, are not continuously and sequentially recorded per path, but recorded according to the interleaving method.

FIG. 7 illustrates an example of a reproduction path of presentation data. A presentation engine reproduces presentation data in response to a presentation command given from a navigation manager. A series of presentation data are recorded in consecutive logical sectors according to a sequence of reading the series of presentation data during multi-path presentation data recording. The presentation data contains multiple recording cells and the navigation manager gives the presentation command with respect to at least one recording cell. Thus, the reproduction path of the presentation data is determined by the sequence of recording cells prescribed by a PGC.

FIG. 7 illustrates multi-path reproduction of presentation data for a movie, where a recording cell from among a plurality of recording cells of the movie is reproduced according to navigation (reproduction command) data. In FIG. 7, "language credit" indicates reproduction of the movie according to a type of language. For instance, in the last scene of the movie, the type of language describing subtitle information regarding characters or producing staff is determined by the "language credit." Otherwise, when the movie includes a scene where a character reads a newspaper, the newspaper may be determined to be a Korean newspaper or an English newspaper according to the "language credit". Also, "director's cut" denotes a particular sequence of video objects of the movie, selected by a movie manufacturer, and "multi-angle" denotes that the movie was shot at multiple camera angles. The presentation data shown in FIG. 7 can be reproduced following multiple paths without pause. Such reproduction of data is called seamless play. Regarding angle data, typically, during reproduction of a movie, a user can change reproduction of one of angle data to another angle data. However, typically, change of a language determined by the language credit is not allowed, that is, reproduction paths according to the language credit might not be changeable.

FIG. 8 illustrates a layout of presentation data with a multi-path structure for seamless play according to the interleaving method. Referring to FIG. 8, the presentation data is recorded using the interleaving method. A presentation engine sequentially reads data from an interleaved block and reproduces the presentation data following a designated path of reproduction while skipping reproduction of undesired data. If data is reproduced following a first path 810, interleaved data, i.e., a first interleaving unit (ILVU) 811, a second ILVU 812, and a third ILVU 813, for the first path 810 is reproduced while skipping reproduction of a first ILVU 821, a second ILVU 822, and a third ILVU 823 for a second path 820. For jumping to a desired track, the presentation engine requires a track buffer that enables the presentation data to be supplied to a decoder without intermission.

Therefore, when multi-path data is divided into predetermined units and recorded using the interleaving method for multi-path reproduction, data stored on the same reproduction path is not continuously recorded in the same area. Accordingly, reproduction positions are unavoidably repeatedly changed, i.e., unnecessary jumps between cells occur, during data reading. In particular, when reproducing data from an optical storage medium or a hard disc that requires a lot of time to change reproduction positions, bit rates of compressed bit streams would be limited to compensate for the reproduction position changes on the optical or hard disc storage medium that requires additional position jumping time, so that the AV data can be reproduced without intermission).

SUMMARY OF THE INVENTION

The present invention provides a recording apparatus effectively recording multi-path data by separately recording presentation streams on respective paths, a reproducing apparatus for reproducing the multi-path data, and an information storage medium on which the multi-path data is recorded. A benefit of the present invention is to record and reproduce without using an interleaving recording and reproducing method, thereby allowing compression of bit streams (AV data) recorded on optical storage media according to unlimited bit rates with respect to a maximum reproducing rate from the optical storage media.

Additional aspects and/or advantages of the invention will be set forth in part in the description which follows and, in part, will be obvious from the description, or may be learned by practice of the invention.

According to an aspect of the present invention, there is provided an information storage medium on which multi-path presentation data is recorded, the information storage medium comprising a plurality of PlayLists storing information regarding reproduction paths forming the multi-path; and at least one clip that is a recording unit recording the presentation data, wherein each PlayList contains at least one PlayItem linked to the at least one clip that is recorded continuously.

According to another aspect of the present invention, there is provided an information storage medium on which multi-path presentation data is recorded, the information storage medium comprising at least one clip that is a recording unit recording the presentation data with respect to respective paths; and additional information regarding a path block (i.e., path block information) including a set of information specifying reproduction paths of the respective paths (specifying reproduction path links to continuously recorded clips). Therefore, according to the present invention, data for a predetermined path is seamlessly reproduced without changing paths when reproducing the presentation data for the respective paths, and the path block additional information is recorded separately from the presentation data.

According to yet another aspect of the present invention, there is provided a reproducing apparatus that reproduces multi-path presentation data, comprising a reading unit that reads the presentation data; and a reproducing unit that reproduces clips that are recording units of the presentation data, based on a PlayList that records a reproduction path of the read presentation data, wherein the clips of the reproduction path are continuously recorded in a same area of an information storage medium.

According to yet another aspect of the present invention, there is provided a recording apparatus that records multi-path presentation data, comprising a processor that processes AV data and generates multi-path presentation data; and a recording unit that records each presentation data of each path in clip units in a same area of an information storage medium and records PlayList information recording reproduction paths of the multi-path presentation data.

BRIEF DESCRIPTION OF THE DRAWINGS

The above and/or other aspects and advantages of the present invention will become more apparent by describing in detail exemplary embodiments thereof with reference to the attached drawings in which.

DETAILED DESCRIPTION OF THE PREFERRED EMBODIMENTS

Figure 1:
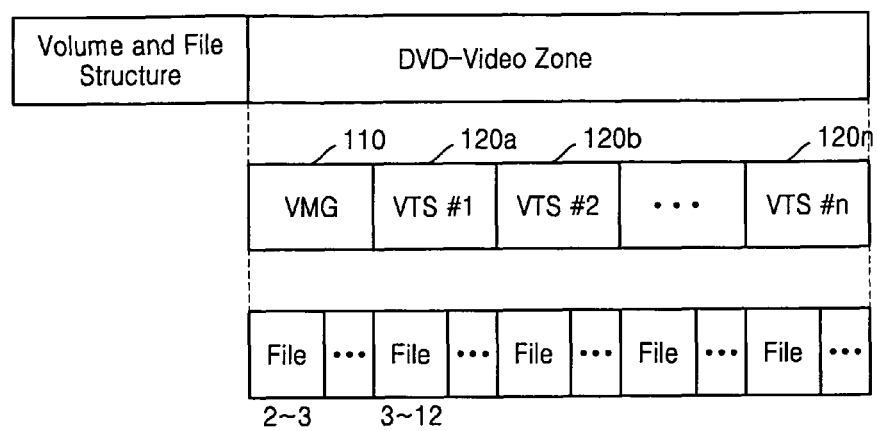
FIG. 1 illustrates a data structure of a digital versatile disc (DVD) with a multi-path data structure according to an interleaving method.
Figure 2:
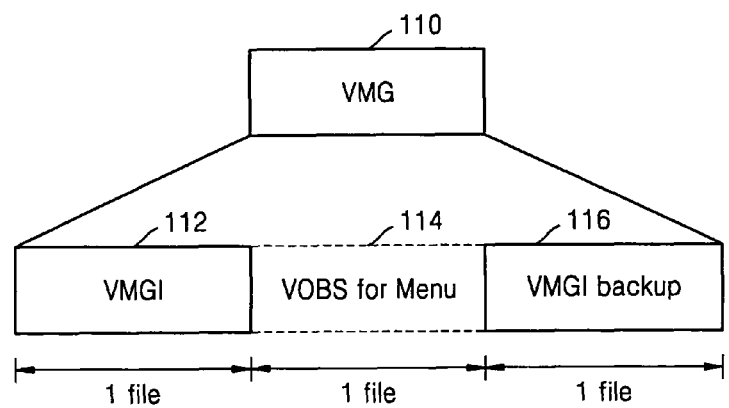
FIG. 2 illustrates a data structure of a video manager (VMG) area of FIG. 1.
Figure 3:
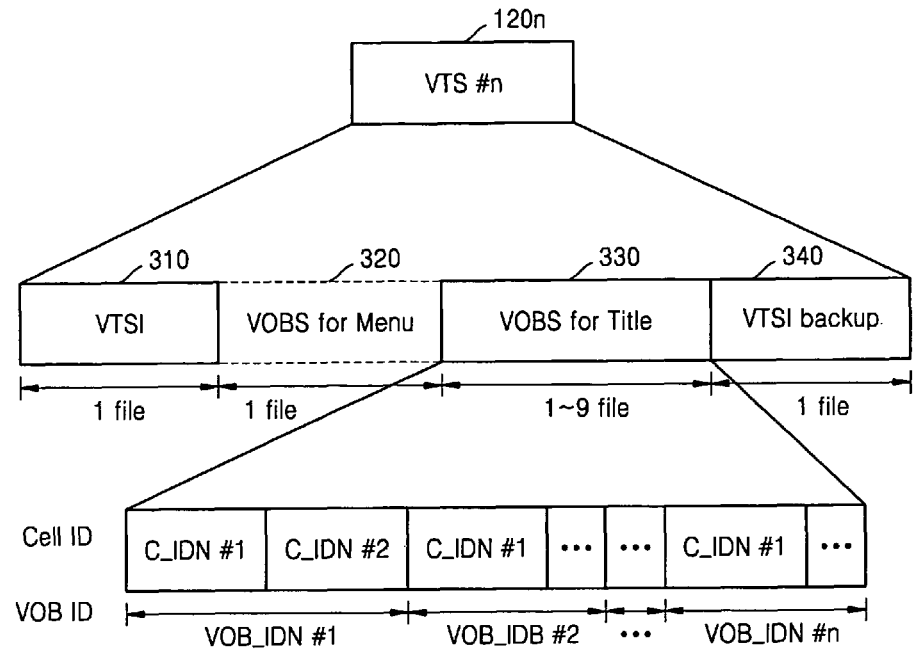
FIG. 3 illustrates a data structure of a video title set (VTS) area of FIG. 1.
Figure 4:
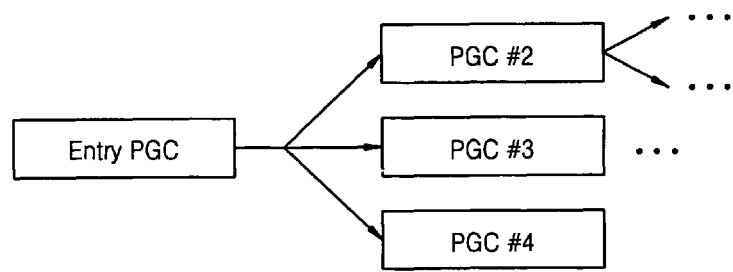
FIG. 4 illustrates a structure of a title linked to a plurality of program chains (PGCs) according to the interleaving method.
Figure 5:
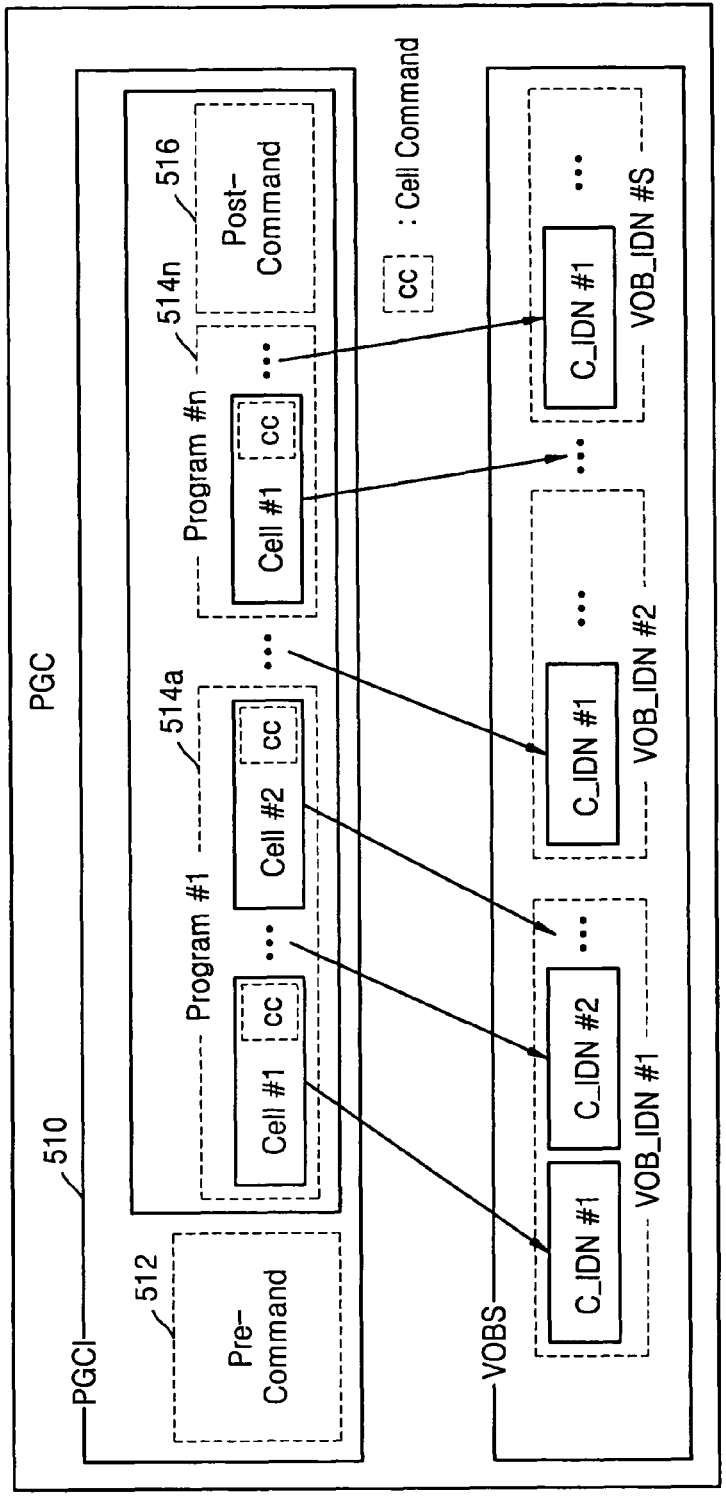
FIG. 5 illustrates a data structure of a PGC according to the interleaving method.
Figure 6:
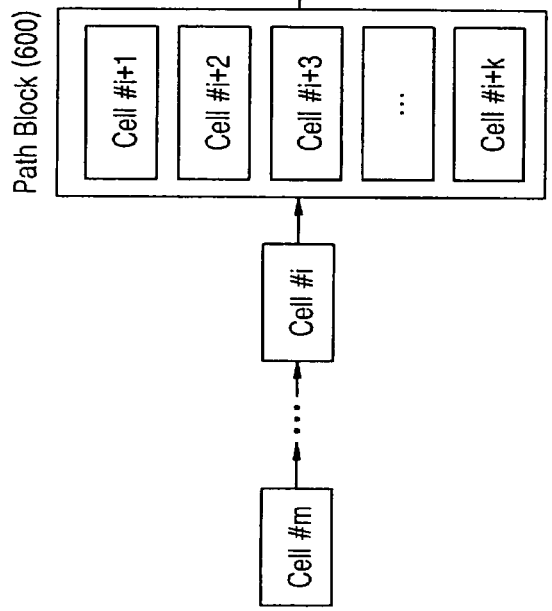
FIG. 6 illustrates a path block.
Figure 7:
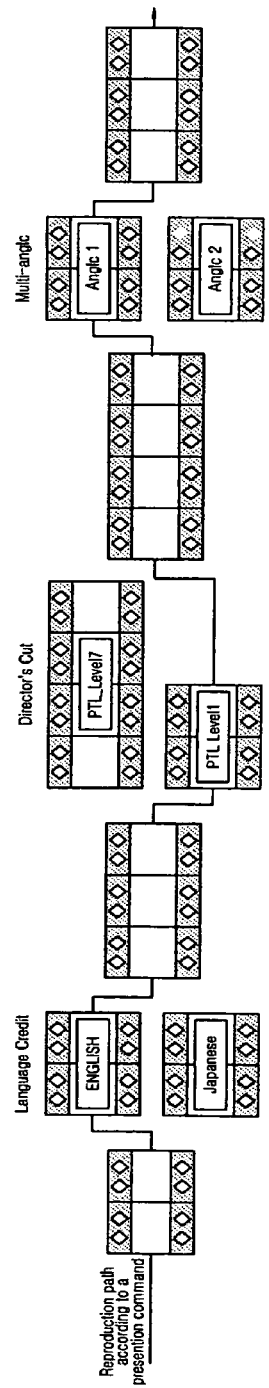
FIG. 7 illustrates a reproduction path of presentation data.

Reference will now be made in detail to the embodiments of the present invention, examples of which are illustrated in the accompanying drawings, wherein like reference numerals refer to the like elements throughout. The embodiments are described below to explain the present invention by referring to the figures.

Since the presentation data is bulky, it is compressed and stored (or transmitted) as compressed bit streams. The present invention discloses use of a clip as a recording unit of the presentation data and a PlayList and a PlayItem as reproduction units. With respect to the DVD, the clip conceptually corresponds to a recording cell that is a recording unit and the PlayList and the PlayItem correspond to a program and a reproducing cell that are reproduction units. In other words, an AV stream is recorded in clip units on an information storage medium according to the present invention. In general, clips (i.e., clips of each path) are recorded in contiguous areas of the information storage medium. An AV stream is also compressed and recorded to reduce the size thereof. When reproducing a recorded clip, clip information recorded in clips is required to interpret the characteristics of compressed presentation data. The clip information specifies AV attributes of each clip and includes an entry point map that describes the positions of entry points enabling random access at predetermined intervals. In the case of the motion picture experts group (MPEG) video compression technique, an entry point is a group of pictures (GOP) header or an I picture that is used as a random access point. The entry point map is mainly used for detecting the position of data in a predetermine time zone after starting of data reproduction.

Figure 9:
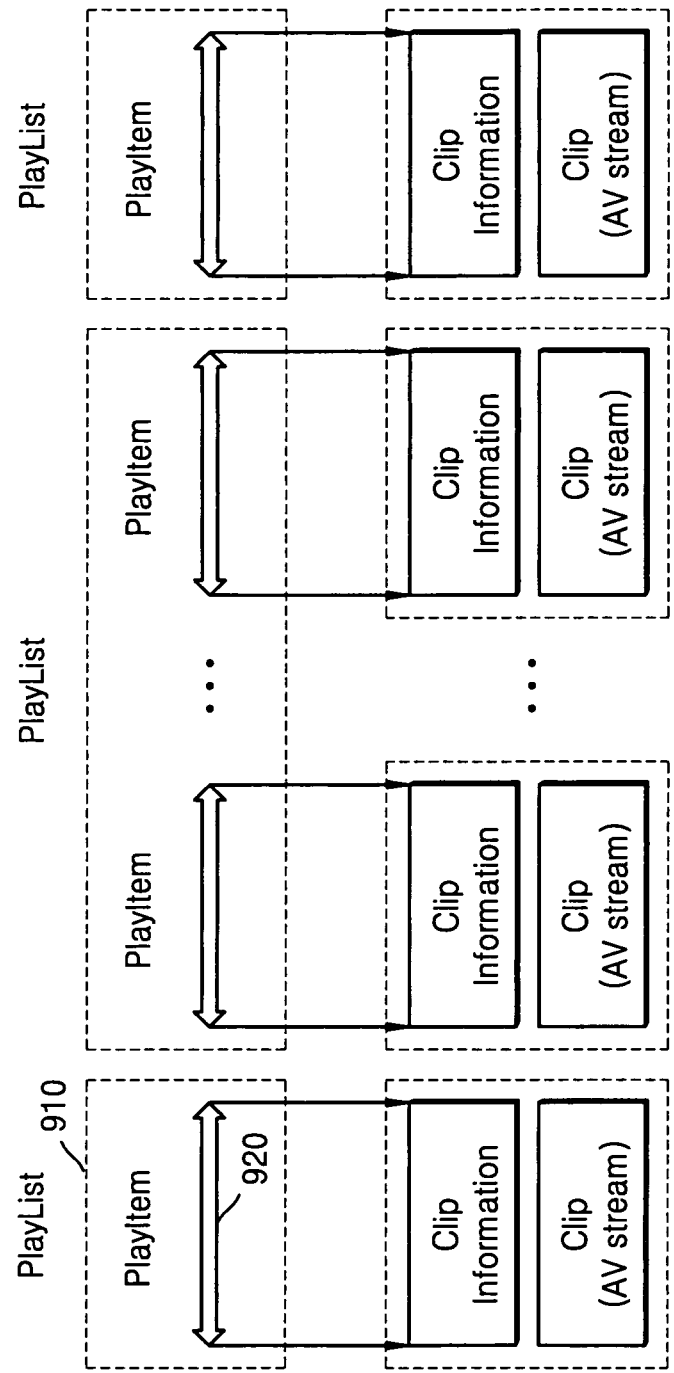
FIG. 9 illustrates the relation among a PlayList, a PlayItem, clip information, and a clip, according to an embodiment of the present invention.

FIG. 9 illustrates the relation among a PlayList, a PlayItem, clip information, and a clip, according to an embodiment of the present invention. Referring to FIG. 9, a PlayList 910 is a basic reproduction unit. An information storage medium according to the present invention contains a plurality of PlayLists. The PlayList 910 is linked to a plurality of PlayItems 920. A PlayItem is a portion of a clip, and more particularly, indicates starting and finishing times of reproduction in a clip. Thus, clip information is used to easily detect a desired portion of a clip.

Figure 8:
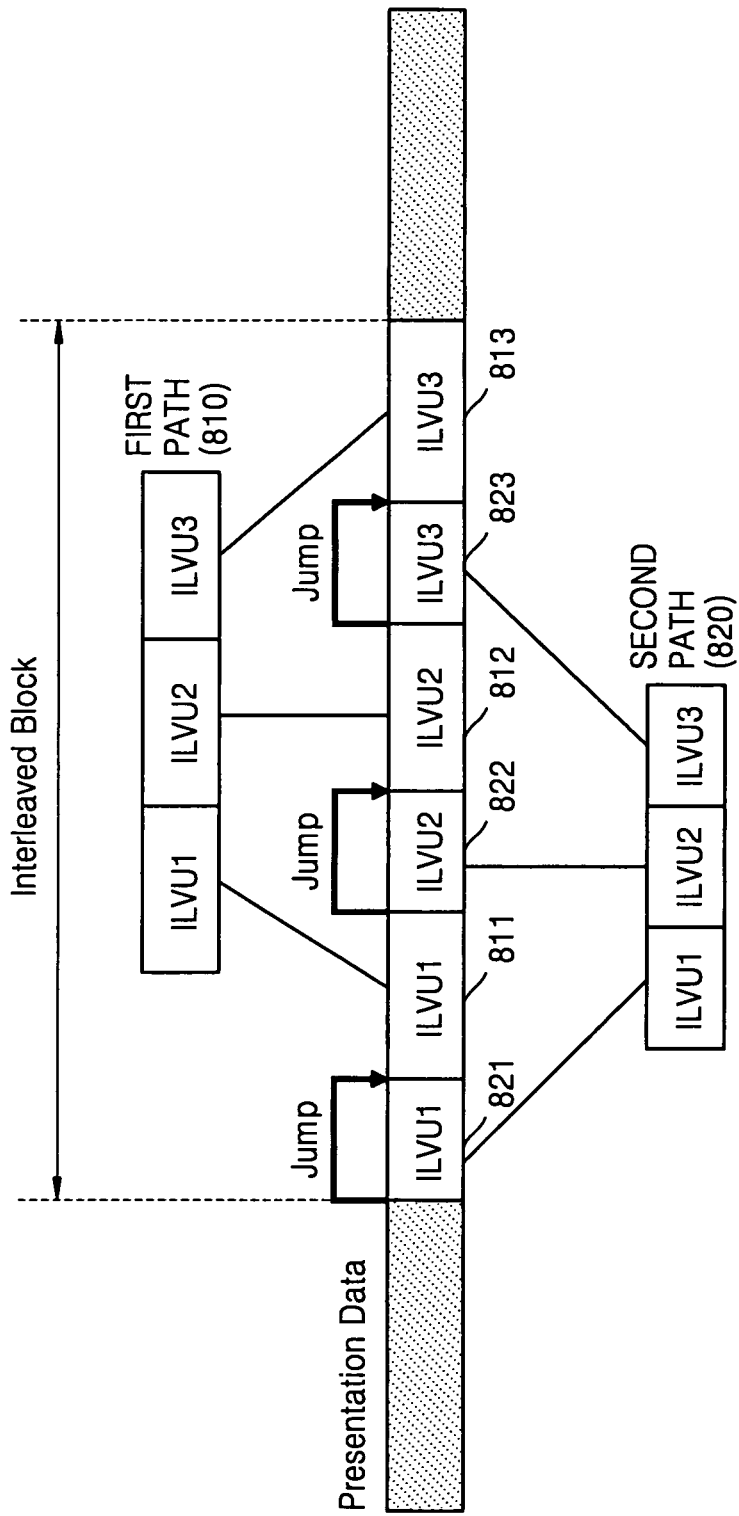
FIG. 8 illustrates a layout of presentation data with a multi-path structure, which is reproduced using seamless play according to the interleaving method.
Figure 10:
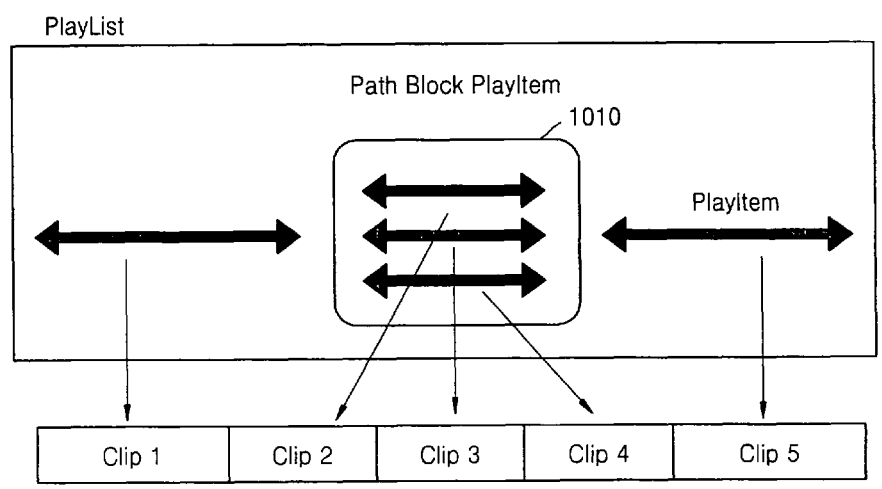
FIG. 10 illustrates a PlayList with a multi-path structure, according to an embodiment of the present invention.

FIG. 10 illustrates a PlayList with a multi-path structure according to an exemplary embodiment of the present invention. As shown in FIG. 10, in general, a plurality of PlayItems corresponding to respective PlayLists have a sequential structure. However, when a plurality of PlayItems are recorded to support multi-path as shown in FIG. 10, the plurality of PlayItems form a PlayItem path block 1010 (referred to as path block hereinafter). The path block 1010 includes PlayItems for multi paths. When reproducing the path block, only one PlayItem thereof is reproduced following a predetermined path. In the exemplary embodiments of the present invention, during the reproduction of the PlayItem, path change is not allowed in the path block PlayItems. In other words, during reproduction of the PlayItem, path change is not allowed in the path block in response to a user input. The path block PlayItems may be constructed to have either the same reproduction time or different reproduction times. Here, clips representing presentation data are divided into predetermined units and recorded in consecutive areas of an information storage medium without using interleaving. Therefore, in contrast to the interleaving units (e.g., ILVU1-3 of first path) of the interleaved block, which are not stored continuously and sequentially as shown in FIG. 8, according to the present invention, each path block PlayItem clip (e.g., clip 2 of a path) is recorded in consecutive areas as shown in FIG. 10.

Figure 11:
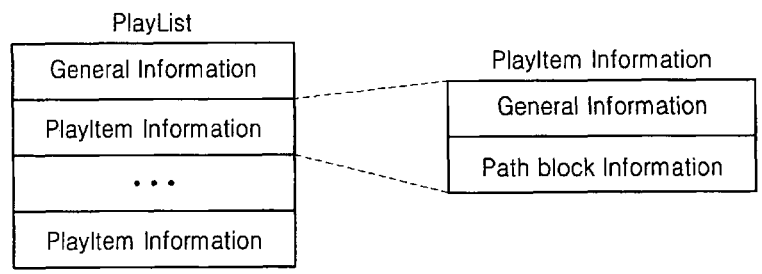
FIG. 11 illustrates a data structure of a PlayList that includes PlayItems that form a path block, and a data structure of a PlayItem included in the path block, according to an embodiment of the present invention.

FIG. 11 illustrates a data structure of a PlayList that includes PlayItems that form a path block, and a data structure of a PlayItem included in the path block. Referring to FIG. 11, each of the PlayItems included in the path block contains the present invention's PlayItem general information and path block information. In general, path block information basically specifies whether some PlayItems included in a PlayList form a path block. Clips referred to by PlayItems forming a path block can be sequentially recorded as shown in FIG. 10. When reproducing presentation data, only one PlayItem is selected from the plurality of path block PlayItems, which constitute the PlayList, to be reproduced. As mentioned above, changes of PlayItems belonging to the same path block are not allowed.

Figure 12:
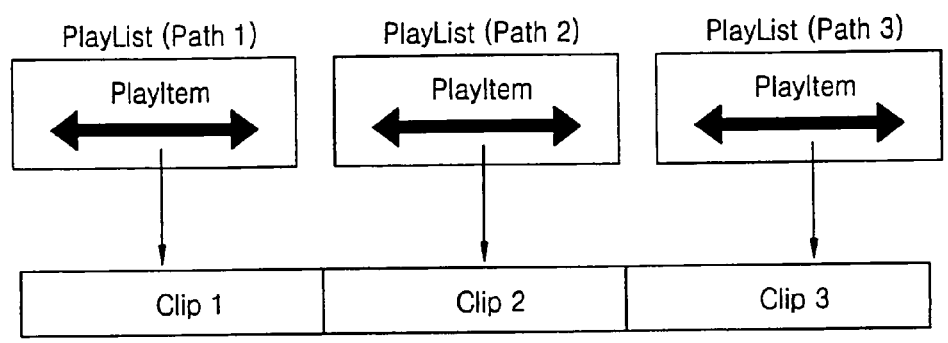
FIG. 12 illustrates PlayLists that are reproduction units, the PlayLists being constructed for respective paths, according to another embodiment of the present invention.

FIG. 12 illustrates an example of PlayLists, i.e., reproduction units, which are constructed for respective paths, according to another embodiment of the present invention. Referring to FIG. 12, a PlayItem belonging to each of the PlayLists does not form a path block, that is, each PlayItem corresponds to a path, and as described in more detail below, the PlayLists include path information.

Figure 13:
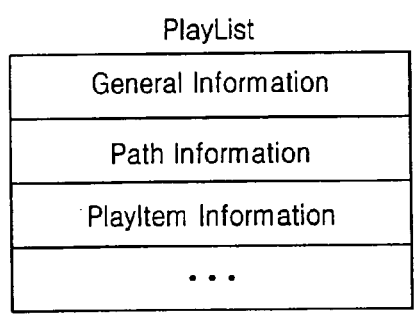
FIG. 13 illustrates a data structure of a PlayList constructed for a path as shown in FIG. 12, according to an embodiment of the present invention.

FIG. 13 illustrates a data structure of a PlayList constructed for a path as shown in FIG. 12, according to an embodiment of the present invention. According to the present invention, as shown in FIG. 13, each PlayList corresponding to different paths further contains path information that specifies its path. When reproducing presentation data, one of the PlayLists for multiple paths is selected and reproduced. As mentioned above, change of PlayLists at the same multiple paths is not allowed. As described above, according to the present invention, multi-path presentation data is divided into predetermined recording units (clip or clips) and recorded in consecutive areas of an information storage medium per path. Also, reproduction units (PlayLists) are provided to be linked to related recording units, which further include multi-path information.

Accordingly, a method of reproducing a multi-path presentation data using a reproducing apparatus according to the present invention will now be described. First, additional information regarding selection of a desired path (i.e., a PlayList with path information, which can be path block information as the case may be) is recorded on an information storage medium, separately from the presentation data. The reproducing apparatus reads the additional information (reads the PlayList with path information) from the information storage medium prior to reproduction of the presentation data and stores the read information in a memory. Next, the reproducing apparatus detects data having the selected path and reproduces the detected data according to the PlayList with the path information. Each clip, which is a recording unit, contains path-block linkage information (a PlayList with path information) regarding the clip presentation data for a corresponding path. Thus, when a path is selected via a PlayList with path information, the linked clips of the PlayList for a related path is continuously reproduced.

The multi-path presentation data can be read from consecutive areas of the information storage medium and reproduced, since clips for respective paths are not interleaved but are recorded in the consecutive areas. For this reason, the multi-path presentation data can be encoded as in general presentation data. Accordingly, for seamless reproduction of data for a path, the multi-path presentation data is not required to be divided into predetermined units and recorded using interleaving.

A recording apparatus according to the present invention records the above clips, additional information for selection of a path (i.e., path information) and reproduction-unit information (i.e., a PlayList with the path information) on an information storage medium, so that PlayLists are made to correspond to paths (FIG. 12). According to an aspect of the present invention, information regarding reproduction units having multiple paths (i.e., a PlayList with path block information) is created and recorded, in which a plurality of PlayItems corresponding to respective clips are formed as the path block, and the PlayList is constructed to be linked to the plurality of PlayItems as the path block (FIG. 10).

Figure 14:
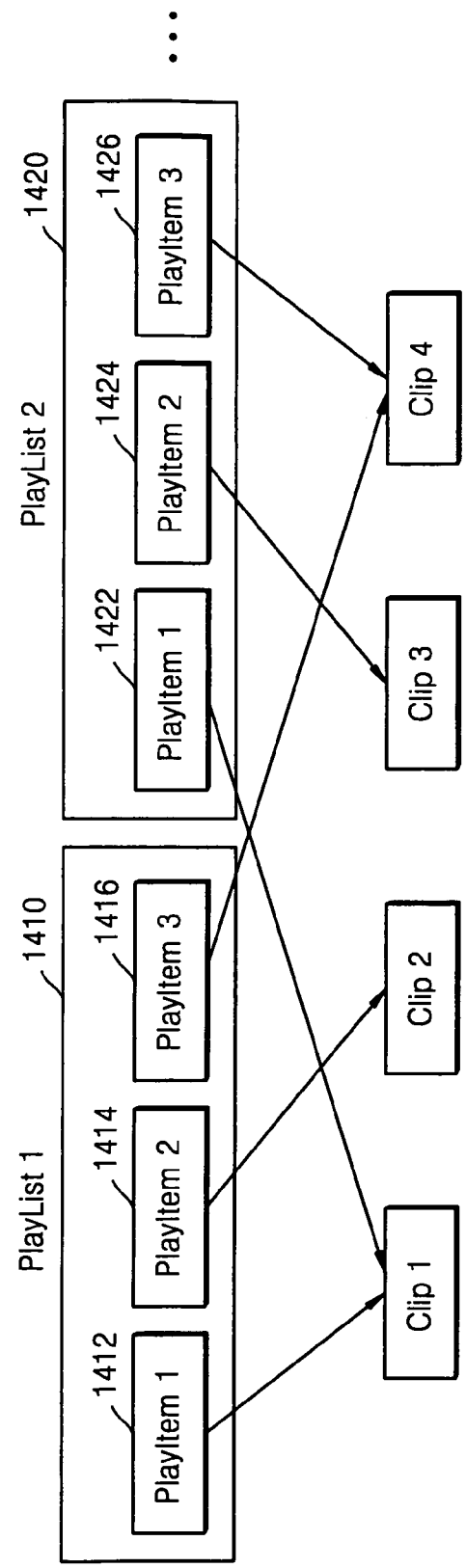
FIG. 14 illustrates the relation among a PlayList, a PlayItem, clip information, and a clip, according to another embodiment of the present invention.

FIG. 14 illustrates the relation among a PlayList, a PlayItem, and a clip, according to another embodiment of the present invention. Each PlayList includes at least one PlayItem and a PlayItem is linked to a clip. Depending, for example, on a value of language credit as navigation data, one of a first PlayList 1410 and a second PlayList 1420 may be reproduced. Parts of PlayItems 1412, 1414, and 1416 belonging to the first PlayList 1410 and PlayItems 1422, 1424, and 1426 belonging to the second PlayList 420 may be linked to the same clips. Since only parts of PlayItems are differently reproduced according to the value of the language credit, they can be linked to additional clips.

Referring to FIG. 14, the first PlayItem 1412 belonging to the first PlayList 1410 is linked to a first clip linked to the first PlayItem 1422 belonging to the second PlayList 1420. The third PlayItem 1416 belonging to the first PlayList 1410 is linked to a fourth clip linked to the third PlayItem 1426 belonging to the second PlayList 1420. The second PlayItem 1414 belonging to the first PlayList 1410 is linked to a second clip and the second PlayItem 1424 belonging to the second PlayList 1420 is linked to a third clip. For instance, a scene where a character of a movie reads a Korean newspaper is the second clip and a scene where the character reads an English newspaper is the third clip. The first and fourth clips may be shared by the first and second PlayLists 1410 and 1420.

Selection of a PlayList to be reproduced has been described in a system parameter of a movie object. For instance, information regarding the language credit is stored in the system parameter. If a value of the language credit corresponds to Korean language, the first PlayList 1410 is reproduced. If the value of the language credit corresponds to English language, the second PlayList 1420 is reproduced.

Figure 15:
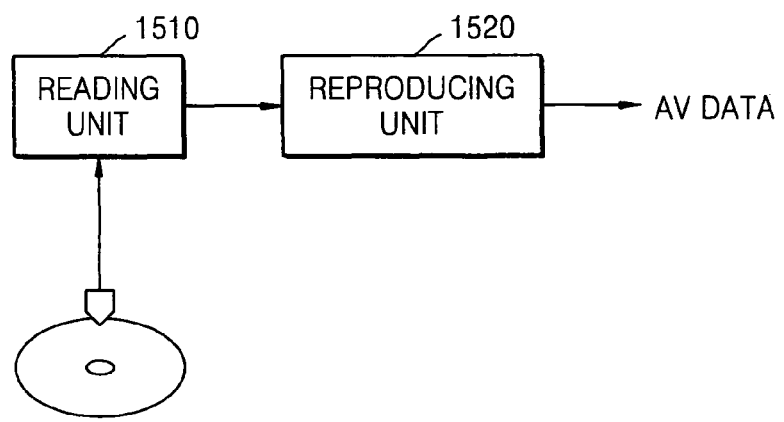
FIG. 15 is a block diagram of a reproducing apparatus, according to an embodiment of the present invention.

FIG. 15 is a block diagram of a reproducing apparatus according to an embodiment of the present invention. Referring to FIG. 15, the reproducing apparatus includes a reading unit 1510 and a reproducing unit 1520. The reading unit 1510 reads presentation data, and the reproducing unit 1520 reproduces a clip, which is a recording unit of the presentation data, based on PlayList information regarding a reproduction path of the read representation data. Clips are continuously recorded in the same area of an information storage medium per path.

The reproducing unit 1520 reproduces at least one clip that can be a recording unit of presentation data for a plurality of paths. In an information area of the clip, entry point information regarding points that can be randomly accessed is recorded. The entry point information enables sequential reproduction of data from a path. The reproducing unit 1520 reproduces reproduction units (PlayLists) including PlayItems corresponding to respective clips. A PlayItem is linked to an entire clip or a portion thereof. Also, the reproducing unit 1520 reproduces a path block comprising a plurality of multi path PlayItems. When the reproducing apparatus reproduces a plurality of PlayItems forming a path block, only one PlayItem is reproduced.

Figure 16:
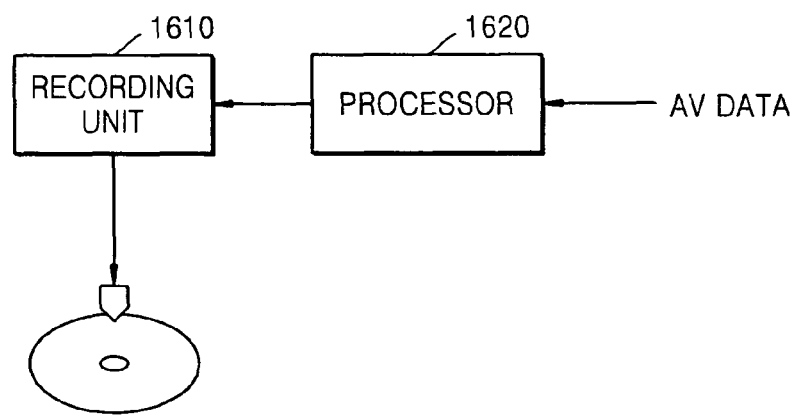
FIG. 16 is a block diagram of a recording apparatus, according to an embodiment of the present invention.

FIG. 16 is a block diagram of a recording apparatus according to an embodiment of the present invention. Referring to FIG. 16, the recording apparatus includes a recording unit 1610 and a processor 1620. The recording unit 1620 continuously records presentation data in clip units in the same area of an information storage medium. The recording unit 1610 records presentation data continuously for respective paths in at least one clip, records PlayItems corresponding to respective clips and a PlayList comprising the plurality of PlayItems as reproduction units to correspond to respective paths, and records information regarding multi-paths as a path block including the plurality of PlayItems (as the case may be).

As described above, according to the present invention, multi-path presentation data and additional path information for selection of a path are recorded in different areas of an information storage medium. The presentation data is divided into predetermined units and recorded in consecutive areas using a separate recording method different from the interleaving method. Accordingly, it is possible to more effectively use a recording space and reduce the frequency of jumping various path recording units of presentation data, thereby effectively reading the multi-path presentation data from the information storage medium. Therefore, the present invention provides a method of providing multi-path presentation data on an information storage medium without the interleaving, comprising recording continuously a plurality of clips containing presentation data of respective paths; recording separately from the clips a plurality of PlayLists specifying reproduction paths forming the multi-path; containing in each PlayList a plurality of PlayItems linked to clips for the respective paths; sharing some of the clips among differing PlayLists for the respective paths (i.e., path PlayLists or PlayLists per path) by linking PlayItems from the different PlayLists to same clips for one path; and seamlessly reproducing the at least one clip of a path without changing paths, when reproducing the presentation data for the respective paths via the PlayLists.

The present invention can be embodied as a computer readable code in a computer readable medium. Here, the computer readable medium may be any recording apparatus capable of storing data that is read by a computer system, e.g., read-only memory (ROM), random access memory (RAM), a compact disc (CD)-ROM, a magnetic tape, a floppy disk, an optical data storage device, and so on. Also, the computer readable medium may be a carrier wave that transmits data via the Internet, for example. The computer readable recording medium can be distributed among computer systems that are interconnected through a network, and the present invention may be stored and implemented as a computer readable code in the distributed system.

While this invention has been particularly shown and described with reference to exemplary embodiments thereof, it will be understood by those skilled in the art that various changes in form and details may be made therein without departing from the spirit and scope of the invention as defined by the appended claims and their equivalents.

What is claimed is:

1. A non-transitory computer-readable medium on which multi-path presentation data is recorded for controlling a multi-path presentation data reproducing apparatus, the computer readable medium comprising:
   at least two clips, each clip comprising the presentation data corresponding to a different reproduction path according to a different language, and
   at least two PlayLists, one of the PlayLists comprising at least one PlayItem, comprising a first PlayItem, and another of the PlayLists comprising at least one PlayItem, comprising a second PlayItem, the first PlayItem comprising information indicating a reproduction interval of one of the at least two clips, the second PlayItem comprising information indicating a reproduction interval of the other one of the at least two clips, the first PlayItem and the second PlayItem forming the multi-path, one of the at least two PlayLists being reproduced according to a movie object and being reproduced,
   wherein each of the at least two PlayLists corresponds to a respective language, and
   wherein the movie object indicates one of the at least two PlayLists based on a system parameter set in the apparatus.

2. The non-transitory computer-readable medium of claim 1, wherein parts of a plurality of PlayItems belonging to different of the plurality of PlayLists are linked to the same clips.

3. The non-transitory computer-readable medium of claim 1, wherein the reproduction interval is defined by a reproduction starting time and a reproduction ending time.

4. A non-transitory computer-readable medium on which multi-path presentation data is recorded for controlling a multi-path presentation data reproducing apparatus, the computer readable medium comprising:
   at least two clips, each clip comprising the presentation data corresponding to a different reproduction path according to a different language;
   at least two PlayLists, one of the PlayLists comprising at least one PlayItem, comprising a first PlayItem, and the other one of the PlayLists comprising at least one PlayItem, comprising a second PlayItem the first PlayItem comprising information indicating a reproduction interval of one of the at least two clips, the second PlayItem comprising information indicating a reproduction interval of the other one of the at least two clips, the first PlayItem and the second PlayItem forming the multi-path; and
   additional information regarding a path block configured to specify reproduction paths of the respective paths,
   wherein data for a predetermined path is configured to be seamlessly reproduced without changing paths when reproducing the presentation data for the respective paths,
   wherein the additional information is recorded separately from the presentation data,
   wherein one of the at least two PlayLists is determined according to a movie object and is reproduced,
   wherein each of the at least two PlayLists corresponds to a respective language, and
   wherein the movie object indicates one of the at least two PlayLists based on a system parameter set in the apparatus.

5. The non-transitory computer-readable medium of claim 4, wherein the at least one clip is continuously recorded.

6. The non-transitory computer-readable medium of claim 4, wherein the at least one clip is recorded in contiguous data clip units for the respective paths.

7. The non-transitory computer-readable medium of claim 4, wherein the additional information is further configured to specify the path block as comprising the at least two PlayItems.

8. The non-transitory computer-readable medium of claim 7, wherein one PlayList is recorded to correspond to one path.

9. A reproducing apparatus that reproduces multi-path presentation data, the apparatus comprising:
   a reading unit configured to read the presentation data; and
   a reproducing unit configured to reproduce at least two clips, each clip comprising the presentation data corresponding to a different reproduction path according to a different language, based on information regarding one of at least two PlayLists, one of the PlayLists comprising at least one PlayItem, comprising a first PlayItem, and the other one of the PlayLists comprising at least one PlayItem, comprising a second PlayItem, the first PlayItem comprising information indicating a reproduction interval of one of the at least two clips, the second PlayItem comprising information indicating a reproduction interval of the other one of the at least two clips, and the first PlayItem and the second PlayItem form the multi-path, one of the at least two PlayLists being determined according to a movie object and being reproduced,
   wherein each of the at least two PlayLists corresponds to a respective language, and
   wherein the movie object indicates one of the at least two PlayLists based on a system parameter set in the apparatus.

10. The reproducing apparatus of claim 9, wherein entry point information regarding randomly accessible points is recorded in information areas of the clips, and the reproducing unit is further configured to sequentially reproduce the presentation data for the respective paths based upon the entry point information.

11. The reproducing apparatus of claim 9, wherein each PlayItem is linked to an entire or a portion of the at least one clip for the respective paths and the PlayItems forming a path block, in which one of the PlayItems is configured to be reproduced when the PlayItems forming the path block are reproduced.

12. The reproducing apparatus of claim 9, wherein each PlayItem is linked to an entire or a portion of the at least two clips for the respective paths and each PlayList corresponds to a reproducible path.

13. The reproducing apparatus of claim 12, wherein:
   the PlayLists are configured to specify reproduction paths corresponding to respective PlayLists; and
   the reproducing unit is further configured to reproduce one of the PlayLists corresponding to a related one of the respective paths.

14. A recording apparatus that records multi-path presentation data, the apparatus comprising:

a programmed processor configured to process:
- at least two clips, each clip comprising the presentation data corresponding to a different reproduction path according to a different language; and
- at least two PlayLists, one of the PlayLists comprising at least one PlayItem, comprising a first PlayItem, and the other one of the PlayLists comprising at least one PlayItem, comprising a second PlayItem, the first PlayItem comprising information indicating a reproduction interval of one of the at least two clips, the second PlayItem comprising information indicating a reproduction interval of the other one of the at least two clips, and the first PlayItem and the second PlayItem forming the multi-path, one of the at least two PlayLists being determined according to a movie object and being reproduced,
- wherein each of the at least two PlayLists corresponds to a respective language, and
- wherein the movie object indicates one of the at least two PlayLists based on a system parameter set in the apparatus.

15. The recording apparatus of claim 14, wherein the programmed computer processor is further configured to record additional information regarding a multi-path specifying a path block including the PlayItems.

16. The recording apparatus of claim 14, wherein each PlayList corresponds to one of the respective paths.

17. The recording apparatus of claim 14, wherein the programmed processor is further configured to record additional information, as multi-path information, regarding a particular path in PlayLists linked to the respective paths.

18. A method of providing multi-path presentation data on an information storage medium without the interleaving, the method comprising:
- recording at least two clips, each clip containing the presentation data corresponding to a different reproduction path according to a different language;
- recording at least two PlayLists, one of the PlayLists comprising at least one PlayItem, comprising a first PlayItem, and the other one of the PlayLists comprising at least one PlayItem, comprising a second PlayItem;
- sharing some of the clips among differing PlayLists for the respective paths by linking PlayItems from the different PlayLists to same clips for one path; and
- seamlessly reproducing the at least one clip of a path without changing paths, when reproducing the presentation data for the respective paths via the PlayLists;
- wherein the first PlayItem comprises information indicating a reproduction interval of one of the at least two clips,
- wherein the second PlayItem comprises information indicating a reproduction interval of the other one of the at least two clips,
- wherein the first PlayItem and the second PlayItem form the multi-path,
- wherein one of the at least two PlayLists is determined according to a movie object and is reproduced,
- wherein each of the at least two PlayLists corresponds to a respective language, and
- wherein the movie object indicates one of the at least two PlayLists based on a system parameter set in the apparatus.

* * * * *